(12) United States Patent
Stanek et al.

(10) Patent No.: US 10,834,587 B2
(45) Date of Patent: Nov. 10, 2020

(54) LIVE GREETINGS

(71) Applicant: American Greetings Corporation, Westlake, OH (US)

(72) Inventors: Brian Stanek, Willoughby, OH (US); Zachary Paladino, Lakewood, OH (US); Phil Peron, Shaker Heights, OH (US); David Noyes, Berea, OH (US); Kathy D'Amato, Cleveland, OH (US); David Chiang, Avon Lake, OH (US); Robert A. Matousek, Lakewood, OH (US)

(73) Assignee: American Greetings Corporation, Westlake, OH (US)

( * ) Notice: Subject to any disclaimer, the term of this patent is extended or adjusted under 35 U.S.C. 154(b) by 542 days.

(21) Appl. No.: 15/316,655

(22) PCT Filed: Sep. 22, 2015

(86) PCT No.: PCT/US2015/051399
§ 371 (c)(1),
(2) Date: Dec. 6, 2016

(87) PCT Pub. No.: WO2016/048992
PCT Pub. Date: Mar. 31, 2016

(65) Prior Publication Data
US 2017/0201473 A1    Jul. 13, 2017

Related U.S. Application Data

(60) Provisional application No. 62/053,441, filed on Sep. 22, 2014.

(51) Int. Cl.
*H04L 12/58* (2006.01)
*H04L 29/08* (2006.01)
*H04W 12/06* (2009.01)
*H04W 4/12* (2009.01)
*H04W 12/10* (2009.01)

(52) U.S. Cl.
CPC ............ *H04W 12/06* (2013.01); *H04L 51/04* (2013.01); *H04L 51/10* (2013.01); *H04L 67/10* (2013.01); *H04W 4/12* (2013.01); *H04W 12/1006* (2019.01)

(58) Field of Classification Search
None
See application file for complete search history.

(56) References Cited

U.S. PATENT DOCUMENTS

| | | | | |
|---|---|---|---|---|
| 9,900,657 | B2* | 2/2018 | Hong | H04N 21/4622 |
| 2003/0078103 | A1* | 4/2003 | Lemay | A63F 13/12 463/43 |

(Continued)

OTHER PUBLICATIONS

International Search Report and Written Opinion in International Application No. PCT/US2015/051399 dated Jan. 29, 2016.

*Primary Examiner* — Aaron N Strange
*Assistant Examiner* — Mohammad Yousuf A. Mian
(74) *Attorney, Agent, or Firm* — Calfee, Halter & Grisworld LLP

(57) ABSTRACT

Systems, methods, and apparatuses disclose an electronic greeting card application for creating, editing, distributing, and viewing electronic greeting cards on a portable computing device, wherein the electronic greeting card displays animations and permits users to customize the card by way of adding a message, signature, photo, and sound recording.

18 Claims, 27 Drawing Sheets

(56) References Cited

U.S. PATENT DOCUMENTS

| | | | |
|---|---|---|---|
| 2005/0135785 A1* | 6/2005 | Kim | G11B 27/105 386/244 |
| 2006/0031121 A1 | 2/2006 | Speicher | |
| 2007/0171278 A1 | 7/2007 | Chen | |
| 2007/0272738 A1 | 11/2007 | Berkun | |
| 2008/0282299 A1* | 11/2008 | Koat | H04L 12/14 725/93 |
| 2012/0173650 A1* | 7/2012 | Ye | H04L 51/066 709/206 |
| 2012/0276880 A1* | 11/2012 | Angorn | H04W 4/12 455/414.1 |
| 2013/0132854 A1* | 5/2013 | Raleigh | G06F 3/0482 715/738 |
| 2013/0159445 A1* | 6/2013 | Zonka | G06Q 10/1093 709/206 |
| 2013/0254417 A1 | 9/2013 | Nicholls | |
| 2014/0068437 A1* | 3/2014 | Dedapper | G06Q 50/01 715/719 |
| 2014/0229810 A1* | 8/2014 | Ramanathan | G06F 17/241 715/202 |
| 2015/0135200 A1* | 5/2015 | Pajuelo Gonzalez | G06F 9/5077 719/328 |

* cited by examiner

LIVE GREETINGS

FIELD OF THE INVENTION

The general inventive concepts relate to electronic greeting cards and, more particularly, to systems, methods, and apparatuses for creating, editing, distributing, and viewing electronic greeting cards on a portable computing device.

BACKGROUND

Greeting cards have been a staple in human communications for centuries. However, the concept of sending greetings via electronic medium is a relatively new phenomenon. Despite the advances in technology, "electronic" greeting cards have been largely limited to desktop computing platforms.

Lately, electronic greeting cards have been implemented as part of mobile applications in portable computing devices. One example of such implementation is disclosed in U.S. patent application Ser. No. 13/460,045, entitled "SYSTEMS, METHODS AND APPARATUSES FOR CREATING, EDITING, DISTRIBUTING, AND VIEWING ELECTRONIC GREETING CARDS," which is hereby incorporated by reference in full.

However, there is a need to provide for systems, methods, and apparatuses which allow a user to create, edit, view, and distribute electronic greeting cards on portable computing devices without sacrificing some of the unique features of paper greeting cards, while at the same time utilizing the technical features that are only available in an electronic medium.

BRIEF SUMMARY

The general inventive concepts contemplate systems, methods, and apparatuses for creating, editing, distributing, and viewing electronic greeting cards on a portable computing device, wherein the electronic greeting card displays animations and permits users to customize the card by way of adding a message, signature, photo, and sound recording. By way of example, to illustrate various aspects of the general inventive concepts, several exemplary embodiments of systems, methods, and/or apparatuses are disclosed herein.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein.

BRIEF DESCRIPTION OF THE SEVERAL VIEWS OF THE DRAWINGS

The accompanying drawings, which are incorporated in and constitute a part of this specification, illustrate some embodiments disclosed herein, and together with the description, serve to explain principles of the embodiments disclosed herein.

DETAILED DESCRIPTION

Figure 1:
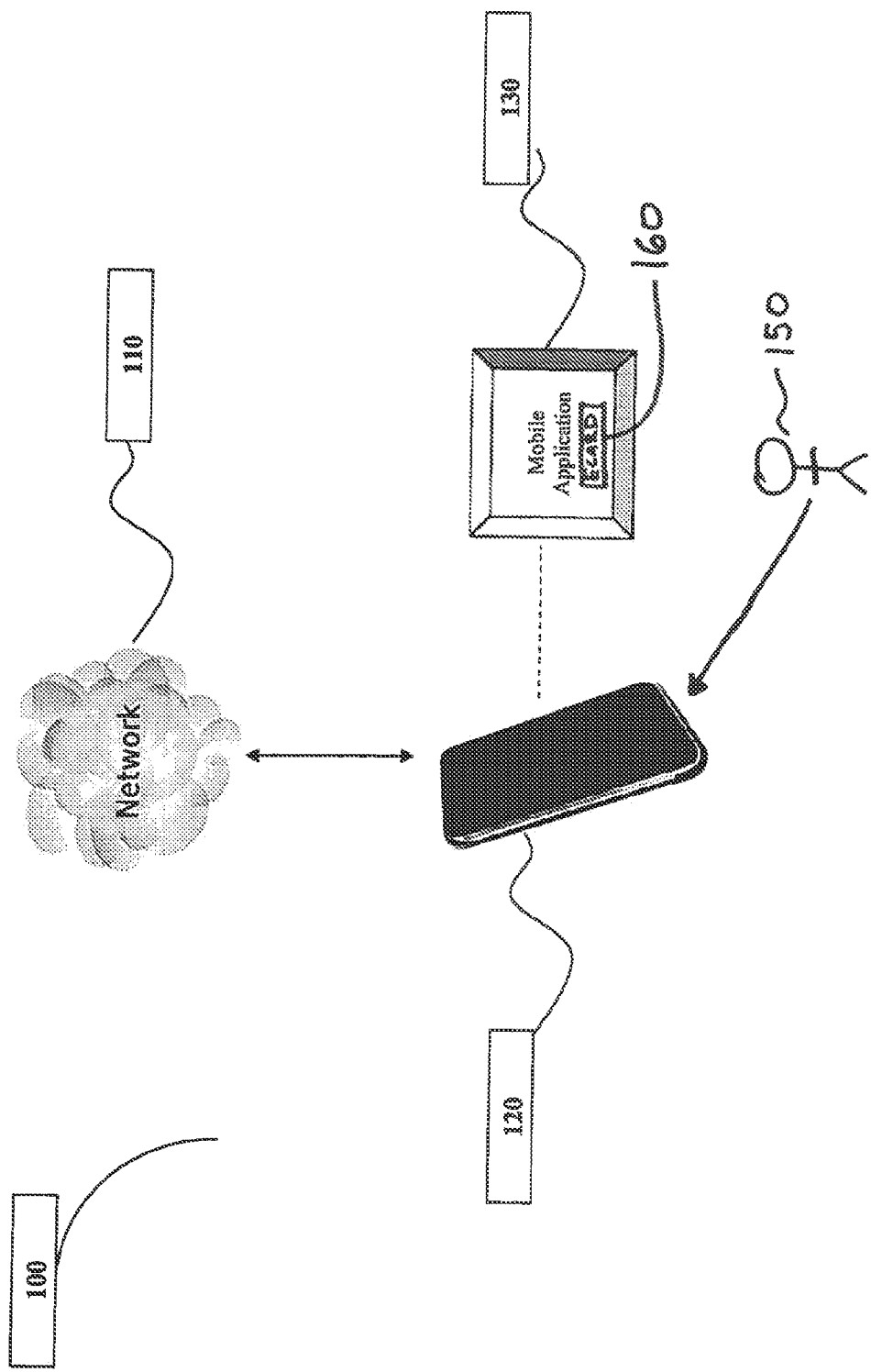
FIG. 1 represents a high level overview of the inventive system.

The embodiments disclosed herein will now be described by reference to some more detailed embodiments, with occasional reference to the accompanying drawings. These embodiments may, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. As used in the specification and the appended claims, the singular forms "a," "an," and "the" are intended to include the plural forms as well, unless the context clearly indicates otherwise.

The following are definitions of exemplary terms used throughout the disclosure. Both singular and plural forms of all terms fall within each meaning:

"Computer" or "computing device" or "processing unit" as used herein includes, but is not limited to, any programmed or programmable electronic device, microprocessor, or logic circuit that can store, retrieve, and process data.

"Portable computing devices" include, but are not limited to, computing devices that combine the powers of a conventional computer in portable environments. Exemplary portable computing devices include portable computers, tablet computers, internet tablets, Personal Digital Assistants (PDAs), ultra mobile PCs (UMPCs), carputers (typically installed in automobiles), wearable computers, and smartphones. The term "portable computing device" can be used synonymously with the terms "computer" or "computing device" or "processing unit."

"Web browser" as used herein, includes, but is not limited to, software for retrieving and presenting information resources on the World Wide Web. An information resource may be a web page, an image, a video, a sound, or any other type of electronic content.

"Software" or "computer program" as used herein includes, but is not limited to, one or more computer or machine readable and/or executable instructions that cause a computer, a portable computing device, microprocessor, logic circuit, or other electronic device to perform functions, actions, and/or behave in a desired manner. The instructions may be embodied in various forms such as routines, algorithms, modules or programs, including separate applications or code from dynamically linked libraries. Software may also be implemented in various forms such as a stand-alone program, an app, a mobile application, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile application" as used herein, includes, but is not limited to, applications that run on smart phones, tablet computers, and other mobile or portable computing devices. The terms "mobile application" or "mobile app" or "software application" or "application" or "app" can be used synonymously with "software" or "computer program" or "application software." Mobile applications allow users to connect to services that are traditionally available on the desktop or notebook platforms. Typically, these services access the Internet or intranet or cellular or wireless fidelity (Wi-Fi) networks, to access, retrieve, transmit and share data.

"Network" as used herein, includes, but is not limited to, a collection of hardware components and computers or machines interconnected by communication channels that allow sharing of resources and information, including without limitation, the worldwide web or Internet. A network maybe "wireless," "wired," or a combination of wired and wireless networks.

"Server" as used herein, includes, but is not limited to, a computer or a machine or a device on a network that manages network resources. The general term "server" may include specific types of servers, such as a Web Server, File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

"Web server" as used herein, includes, but is not limited to, a server which serves content to a web browser by loading a file from a disk, or automatically generating a response by combing a search result from a database or other repository with calculations based on client request parameters and business rules and logic embedded in the software, and serving it across a network to a user's web browser, typically using a hyper text transfer protocol (HTTP).

Reference will now be made to the drawings. FIG. 1 is a high level overview of the inventive system 100. System 100 comprises a mobile application 130 ("ecard app"), which is housed on a portable computing device 120. The portable computing device 120 and the ecard app 130 are in communication with a network 110. Access to network 110 allows the portable computing device 120 to obtain and refresh content that is subsequently utilized by the ecard app 130. A user 150 utilizes the ecard app 130 to create and send one or more electronic greeting cards ("ecard") 160.

The electronic greeting card(s) may be any commercially or non-commercially available electronic greeting card. One embodiment of a customizable electronic greeting card 160 is disclosed in U.S. patent application Ser. No. 13/460,045, entitled "SYSTEMS, METHODS AND APPARATUSES FOR CREATING, EDITING, DISTRIBUTING, AND VIEWING ELECTRONIC GREETING CARDS," ("the '045 application") which is hereby incorporated by reference in full.

The ecard 160 is customizable. For instance, user 150 may add/edit a personalized message, a signature, a photo, and a sound recording to the ecard 160.

Figure 2:
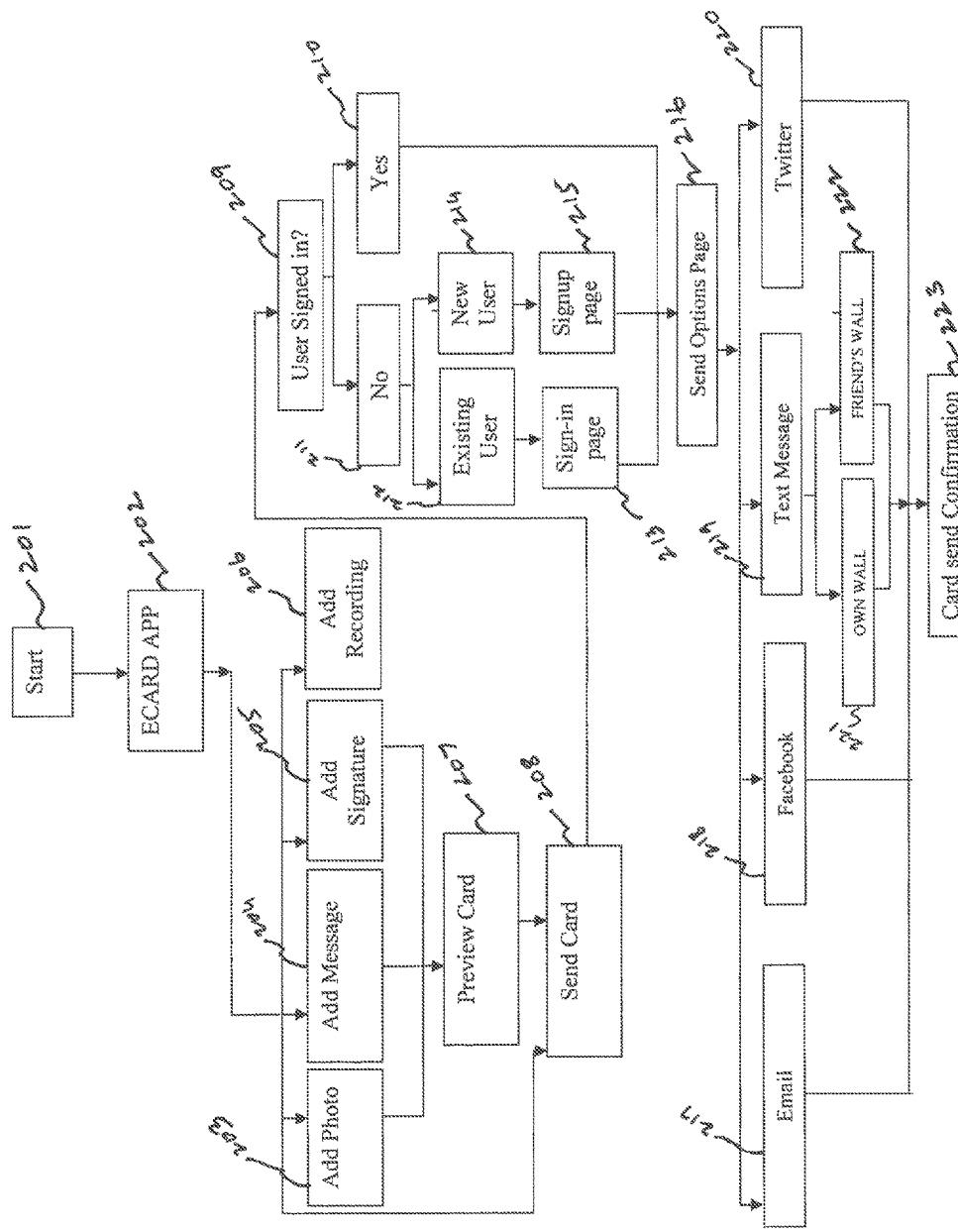
FIG. 2 is an exemplary flowchart of the inventive system.

FIG. 2 is a flow chart of exemplary system 100 of the present invention. The system flow represents the flow of the software and begins at step 201. At 202, the ecard app 130 will be implemented as a mobile application on the portable computing device 120 and presented to user 150. The ecard app 130 may be programmed using object oriented technology such as Objective-C® and Java®.

If user 150 proceeds to build an ecard 160, user 150 is directed to four personalization options 203, 204, 205, and 206, which allow user 150 to personalize the ecard 160 by adding a photo, adding a message, adding a signature, and adding a sound recording respectively. User 150 can then preview the customized card at step 207, and choose to send the card at step 208.

If the user 150 chooses to send the ecard 160 at step 208, user 150 is directed to step 209, where the system 100 checks to see if user 150 is signed in to the services offered as part of the system 100. If user 150 is signed in (210), user 150 is directed to the send options page at step 216. If user 150 is not singed in (211), user 150 is presented with two options, an existing user sign in page at step 212, or a new user sign up page at step 214. If user 150 is an existing user and indicates as such in the app 130 (step 212), user 150 is directed to step 213, where user 150 signs in to the system 100 with their user credentials (e.g. a username and a password). After the sign-in process is complete, user 150 is directed to the send options page at step 216. If user 150 is a new user and indicates as such in the app 130 (step 213), user 150 is directed to step 215, where user 150 creates new user credentials (e.g. a username and a password). After creating new user credentials, user 150 is directed to the send options page at step 216.

The send options step 216 further presents user 150 with four send options 217, 218, 219, and 220, which allow user 150 to send the ecard 160 via Email, Facebook®, Text Message (or Short Messaging Service Message or iMessage®), and Twitter® respectively. If user 150 chooses the Facebook send option at step 218, user 150 is able to either send the ecard 160 to a "friend" on Facebook (at step 222), or simply share the electronic greeting card 160 on their own Facebook "wall" (at step 221). The four send options presented at steps 217, 218, 219, and 220 are not mutually exclusive. User 150 may choose to send the ecard 160 using one or more of the four send options (217, 218, 219, and 220) sequentially or in any order.

After sending the ecard 160 using one or more of the four options 217, 218, 219, and 220, user 150 is directed to a card send-confirmation page at step 223, thereby completing the send cycle.

Referring now to FIGS. 3-18, an exemplary embodiment of the operations of the inventive system 100 for creating, editing, and distributing electronic greeting cards 160 on a client device 120 is shown.

Figure 3:
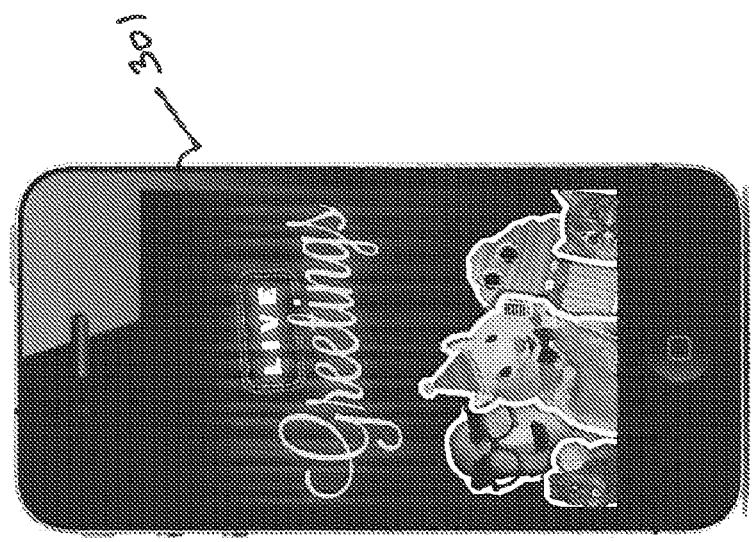
FIGS. 3-23 describe the operations of the inventive system for creating, editing, distributing, and viewing electronic greeting cards on an exemplary client device using exemplary screens.
Figure 4:
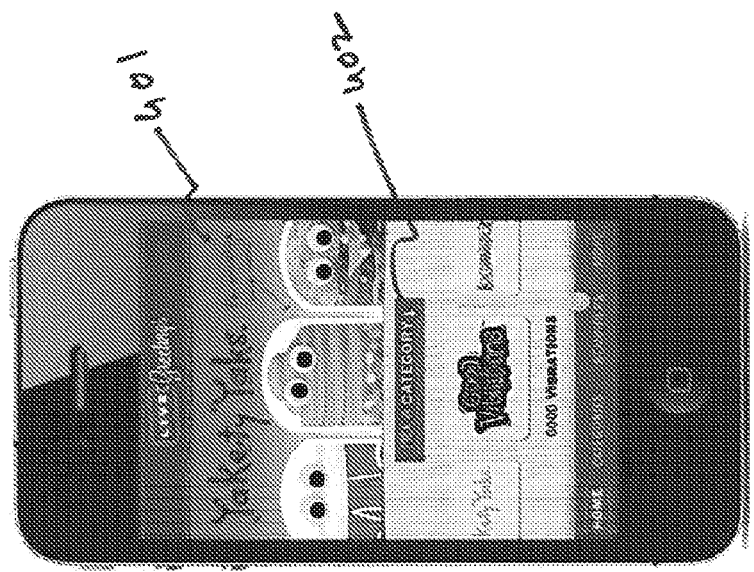
Figure 5:
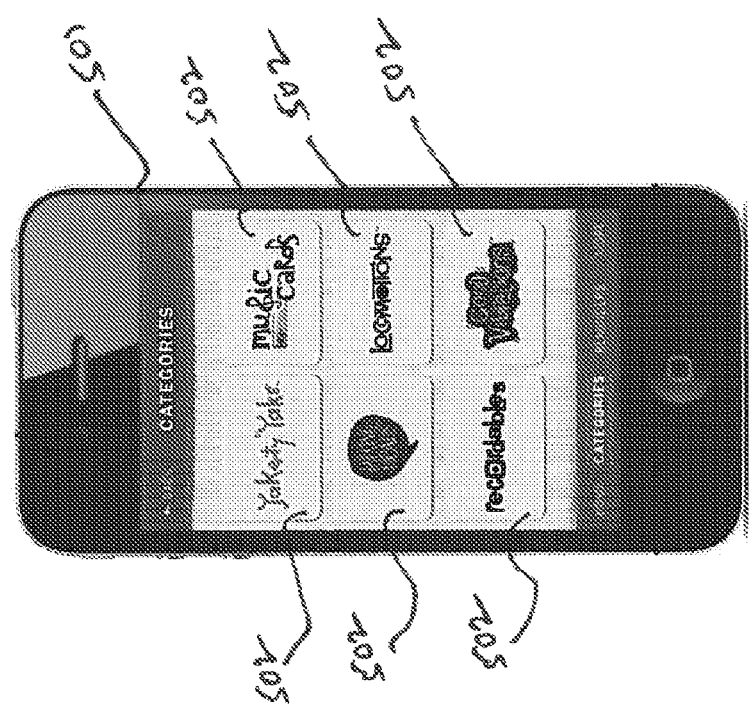
Figure 6:
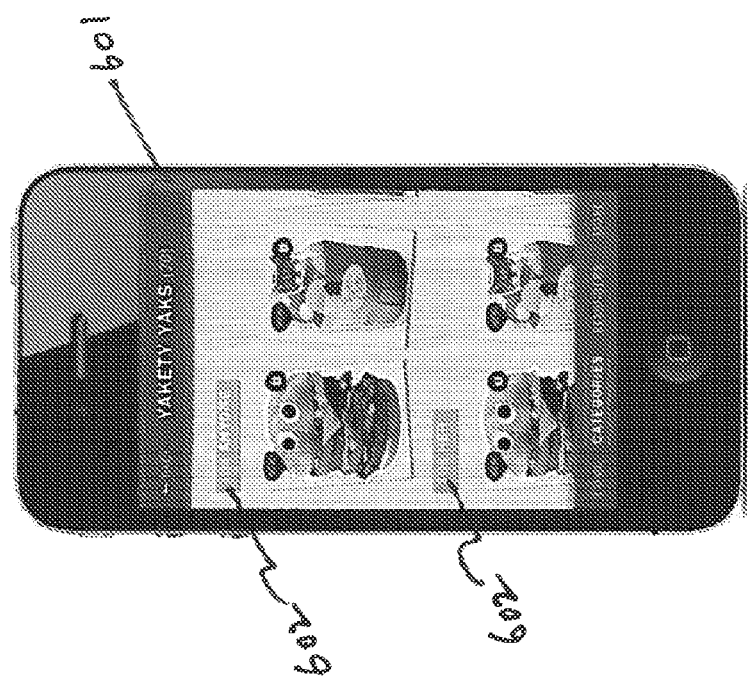

FIG. 3 shows an exemplary start screen 301 of the ecard app 130. FIG. 4 shows an exemplary home page 401 of the ecard app 130. At 401, user 150 begins the process of choosing an ecard 160 by first selecting a category selector 402. Once user 150 chooses the category selector 402, user 150 is directed to category screen 501 shown in FIG. 5. In the category screen 501, user 150 is presented with one or more categories 502. Categories 502 represent the groupings by which all ecards 160 available in the system 100 are made accessible to the app 130. One user 150 chooses a category 502, user 150 is directed to card selector screen 601 as shown in FIG. 6. Card selector screen 601 may further comprise additional categories or sub-categories 602. Categories 602 represent sub-groupings (under each category 502) by which all ecards 160 available in the system 100 are made accessible to the app 130. User 150 is prompted to select one ecard 160 from the card selector screen 601.

An advantage of the present invention is that the ecard 160 may include an animated electronic greeting card. An animated electronic greeting card renders animations (such as shaking cards, shaking or moving objects, talking objects, talking cards etc.) both while building and while viewing the electronic greeting card. Animations of the cards are made possible by utilizing technologies such as Objective-C®, Java®, JavaScript®, Scalable Vector Graphics, Extensible Markup Language®, Cascading Style Sheets and the like.

Figure 7:
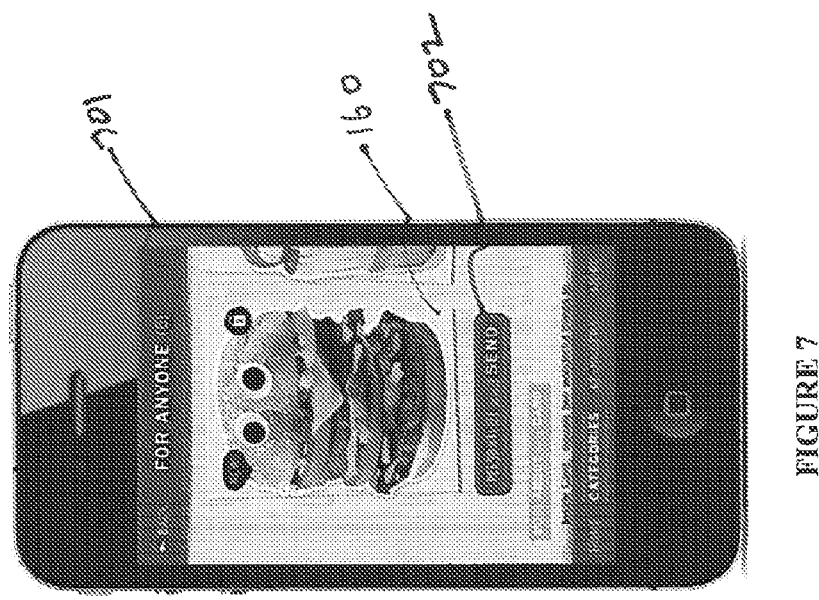
Figure 8:
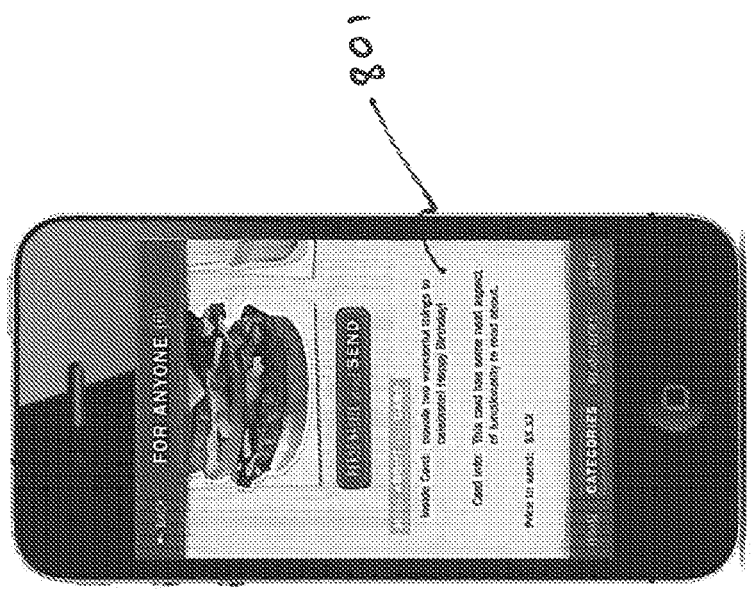
Figure 9:
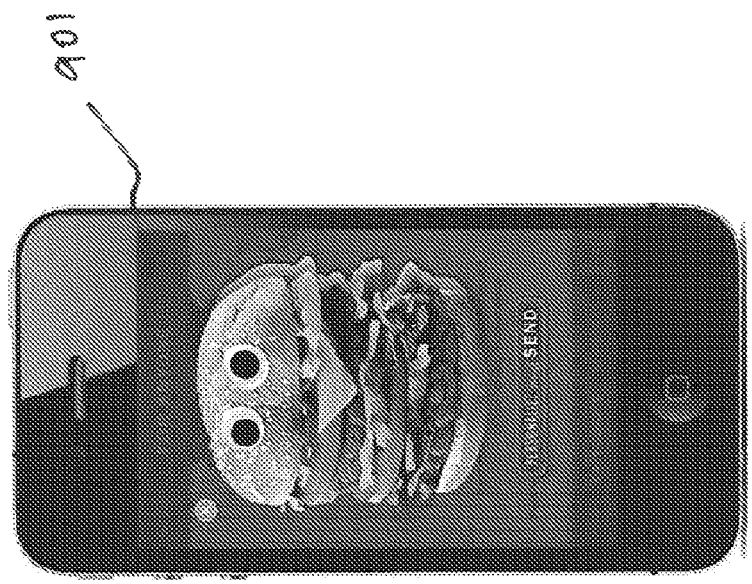
Figure 10:
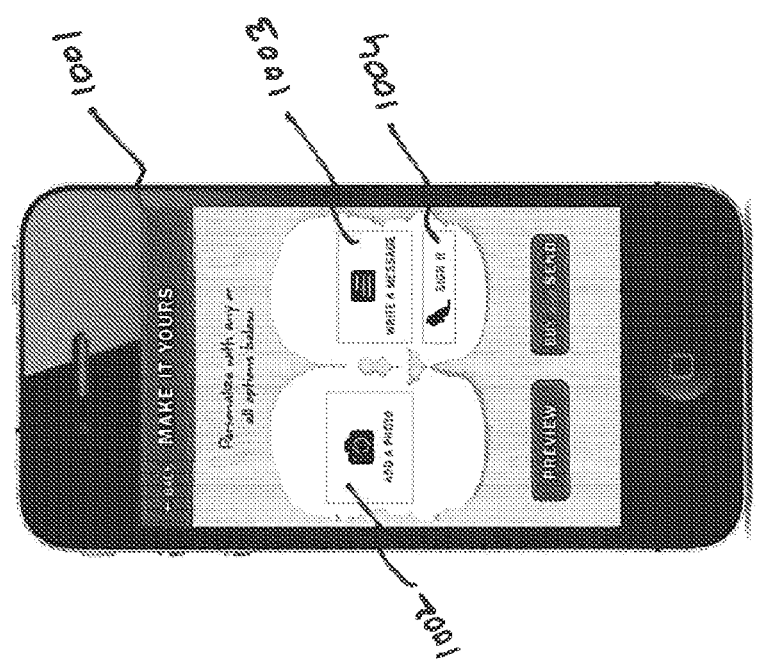
Figure 11:
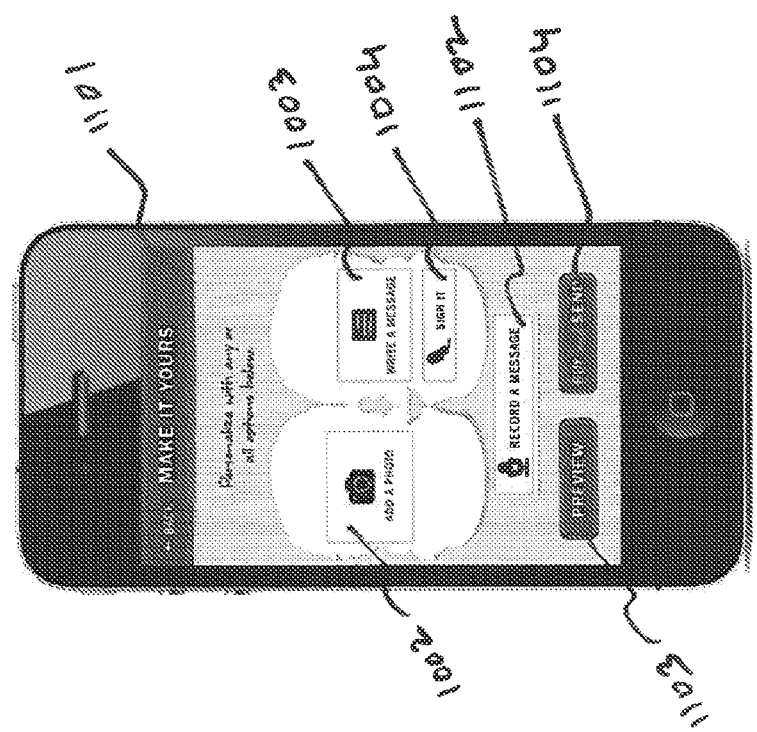

Upon selection of the ecard 160, user 150 is directed to the card home page screen 701 as shown in FIG. 7. Here, user 150 is prompted to personalize and send the ecard 160 via selector 702. Screen 801 of FIG. 8 shows the additional information that is made available to user 150 regarding ecard 160. Screen 901 of FIG. 9 shows the selected ecard 160 to user 150 prior to the personalization steps. One embodiment of the ecard personalization options are shown in screen 1001 of FIG. 10. Screen 1001 comprises three personalization options, for adding a photo (1002), for adding a message (1003), and for adding a signature (1004). Another embodiment of the ecard personalization options are shown in screen 1101 of FIG. 11. Screen 1101 comprises the previously disclosed personalization options for adding a photo (1002), for adding a message (1003) and for adding a signature (1004). Additionally, screen 1101 further comprises an option for the user to record a message at 1102.

Figure 12:
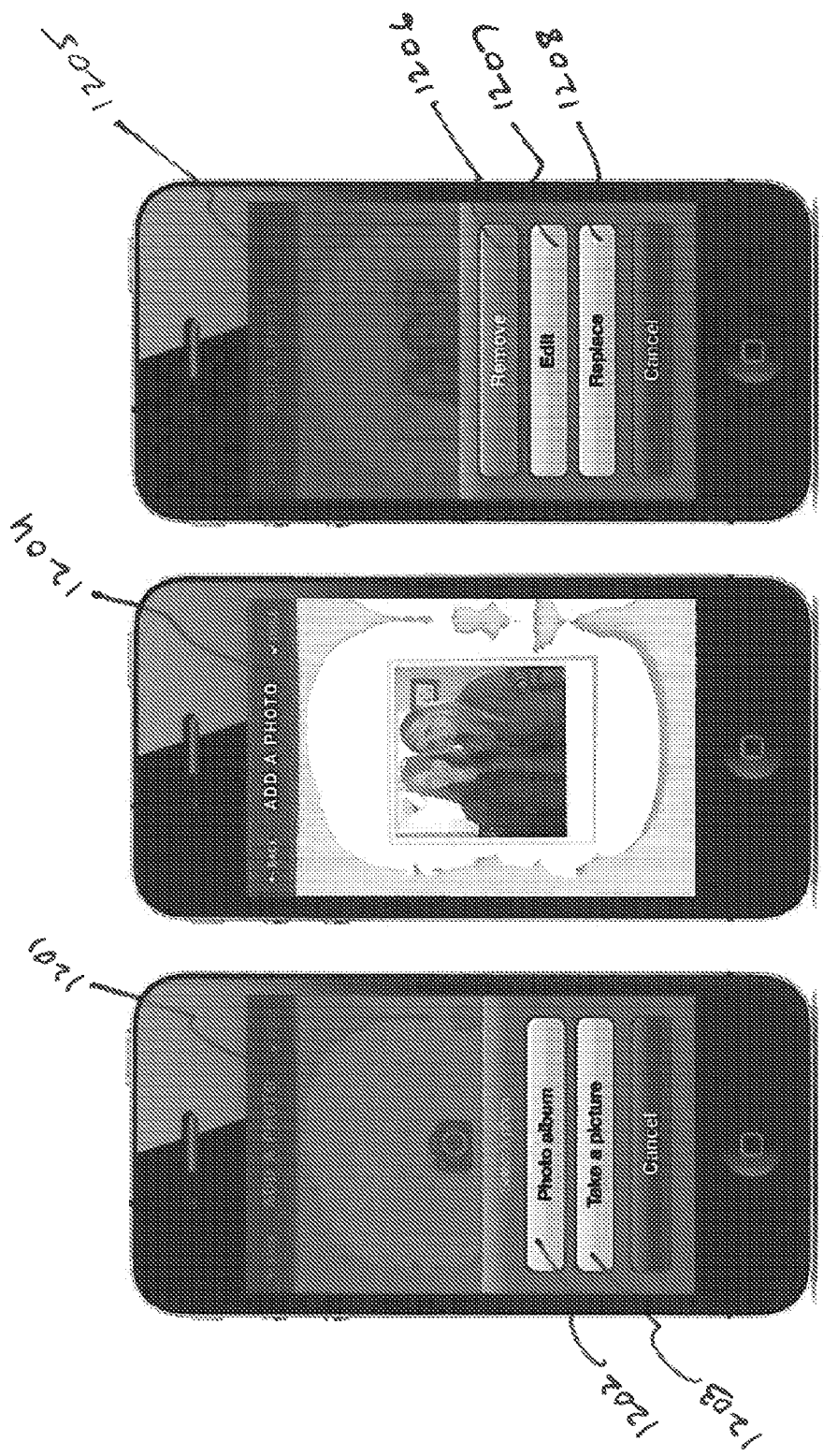

If user 150 selects 1002 to add a photo, user 150 is directed to screen 1201 of FIG. 12, where user 150 may choose to upload a photo either by choosing an existing photo from the portable computing device's 120 native photo album (at 1202), or by choosing to take a new photo using the portable computing device's 120 native camera (at 1203). Once user 150 uploads a photo, either by selecting an existing photo or by taking a new photo, user 150 is shown a preview of the uploaded photo in screen 1204. Screen 1204 is identical to screen 1101, with the exception that an uploaded photo is now shown in place of personalization option 1002. User 150 may choose to remove, edit, or replace the photo shown in screen 1204, by selecting the photo shown in screen 1204. Once selected, user 150 is presented with the option to remove the photo (at 1206), edit it (at 1207), or replace it (at 1208) as shown in screen 1205. If user 150 chooses to remove the photo uploaded at screen 1204 by selecting 1206, user 150 may be re-directed to screen 1201 to upload another photo. Alternately, user 150 may be re-directed to screen 1101 to further customize ecard 160. Similarly, if user 150 chooses to replace the photo uploaded at screen 1204 by selecting 1208, user 150 may be re-directed to screen 1201 to upload another photo. Alternately, user 150 may be re-directed to screen 1101 to further customize ecard 160. If user 150 chooses to edit the photo uploaded at screen 1204 by selecting 1207, user 150 may be re-directed to screen 1204 or to another screen (not shown) to edit the existing photo. Although not shown in the Figures, user 150 may also choose to upload photos from social network sites such as Google+®, Facebook®, Twitter®, Instagram® and the like.

Figure 13:
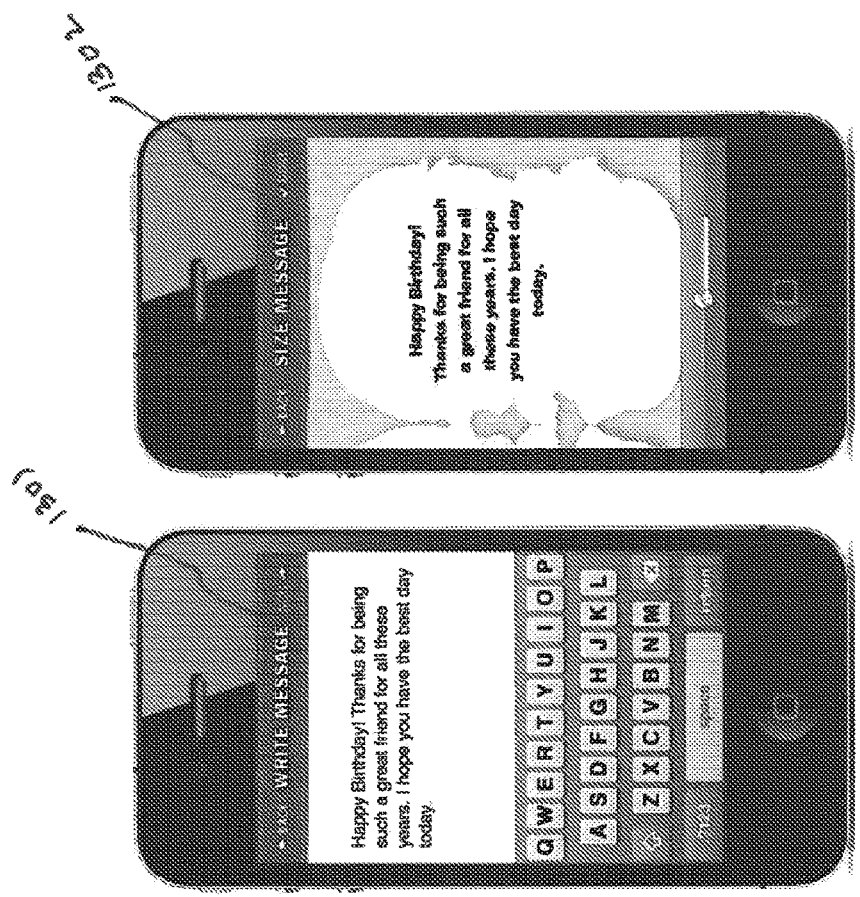

Referring back to FIG. 11, if user 150 selects 1003 to add a message, user 150 is directed to screen 1301 of FIG. 13, where user 150 may choose to enter a personalized message. Once a personalized message is entered, user 150 is directed to screen 1302 where a preview of the personalized message is shown. Screen 1302 is identical to screen 1101, with the exception that the personalized message is now shown in place of personalization option 1003.

Figure 14:
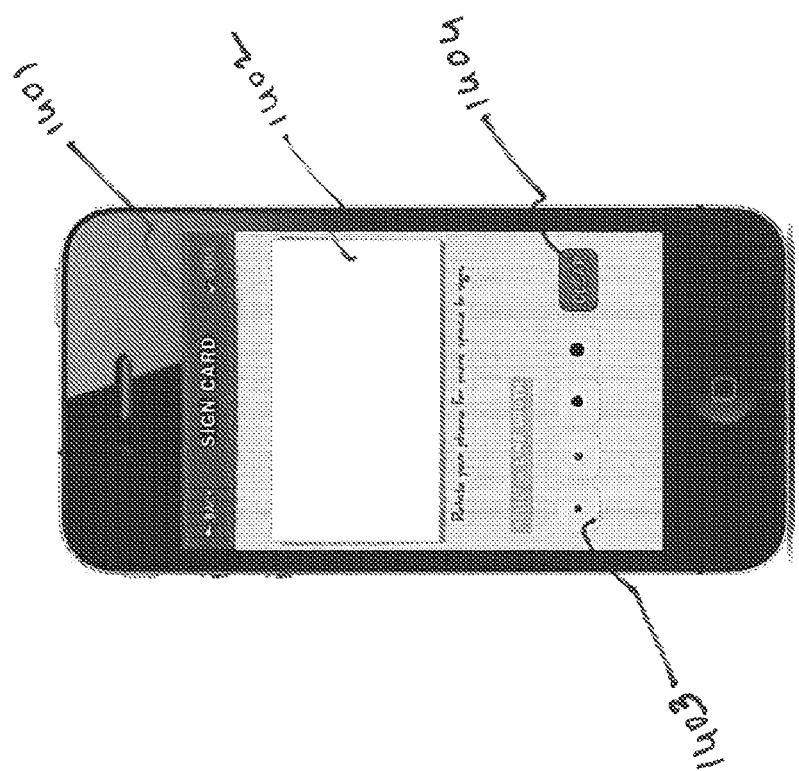

Referring back to FIG. 11, if user 150 selects 1004 to add a signature, user 150 is directed to screen 1401 of FIG. 14, where user 150 may choose to enter a personalized signature in a signature area 1402. The size of the signature may be adjusted using the adjustment radio buttons 1403. Adjustment buttons 1403 may any selector including buttons, a sliding bar, size selection menus, etc. The signature may also be deleted/cleared using the clear selector 1404. Once a personalized signature is entered, user 150 is directed to screen 1101 (or to an intermediary screen, not shown), to show user 150 a preview of the personalized signature, in place of showing the personalization option selector 1004.

Figure 15:
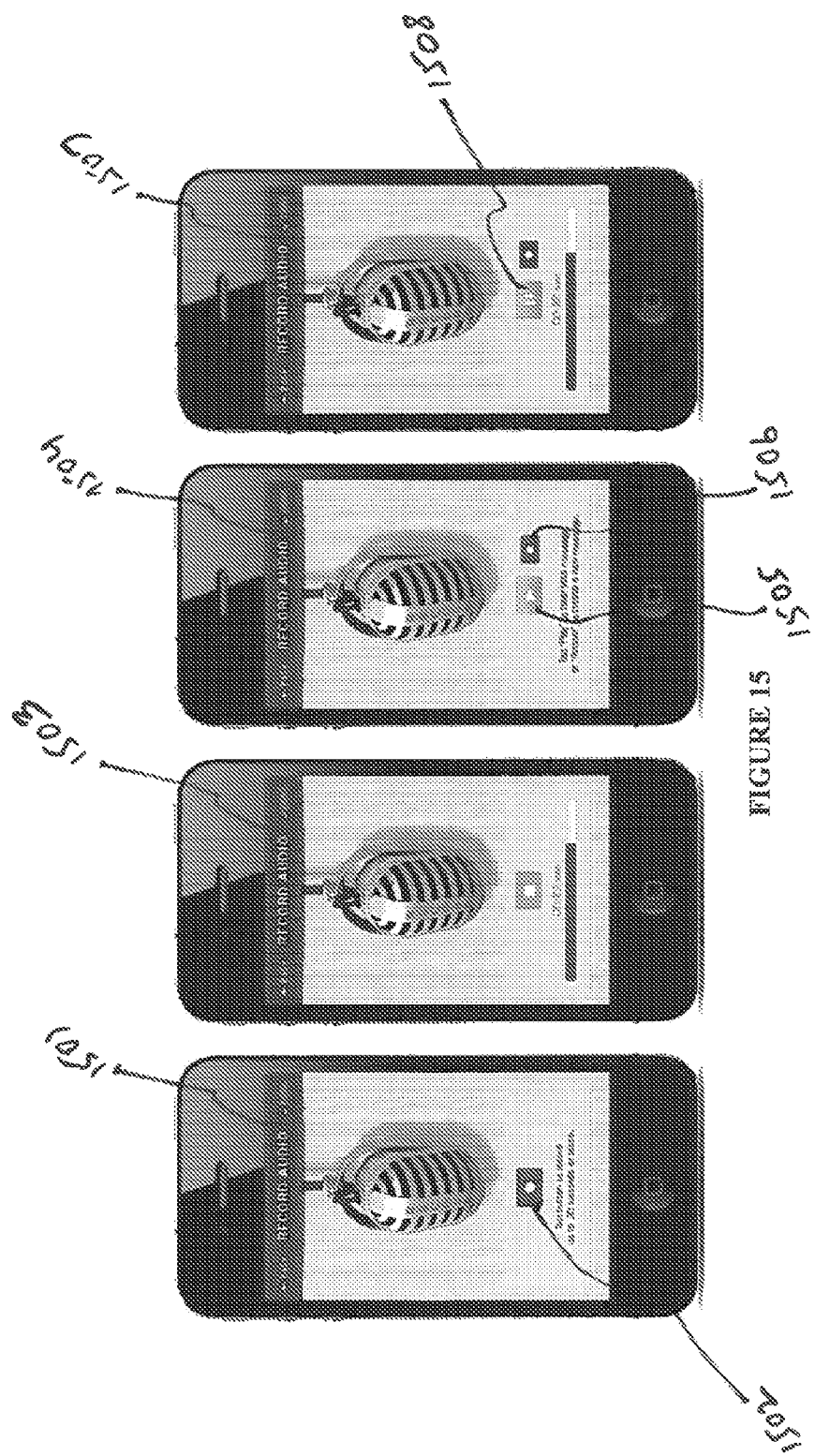

Referring back to FIG. 11, if user 150 selects 1102 to record a message, user 150 is directed to screen 1501 of FIG. 15, where user 150 may choose to record a personalized message by activating the recording selector 1502. User 150 may choose to record any message using the selector 1502. In an embodiment, user 150 may record his/her own voice. In another embodiment, user 150 may record an external sound, such as music playing on an external device or on device 120. In another embodiment, user 150 may mix his/her own voice with an external sound. The progress of a user's message recording is shown in screen 1503. After the message is recorded, user 150 is given the option to play back the most recently recorded message (at 1505) or to re-record a message (at 1506), as shown on screen 1504. Screen 1507 shows the playback of the recorded message (at 1508).

Referring back to FIG. 11, user 150 has the option to preview the ecard 160 by selecting the preview selector 1103, or to send the ecard 160 to a recipient (as described below with reference to FIGS. 19-23) by selecting the send selector 1104. The preview selector 1103 and the send selector 1104 may be activated by user 150 either before or after the personalization steps 1002, 1003, 1004, and 1102. Further, user 150 may activate preview selector 1103 and the send selector 1104 even after having completed less than the four personalization steps available.

The following description provides an exemplary workflow of the steps involved in sending the ecard 160.

Figure 24:
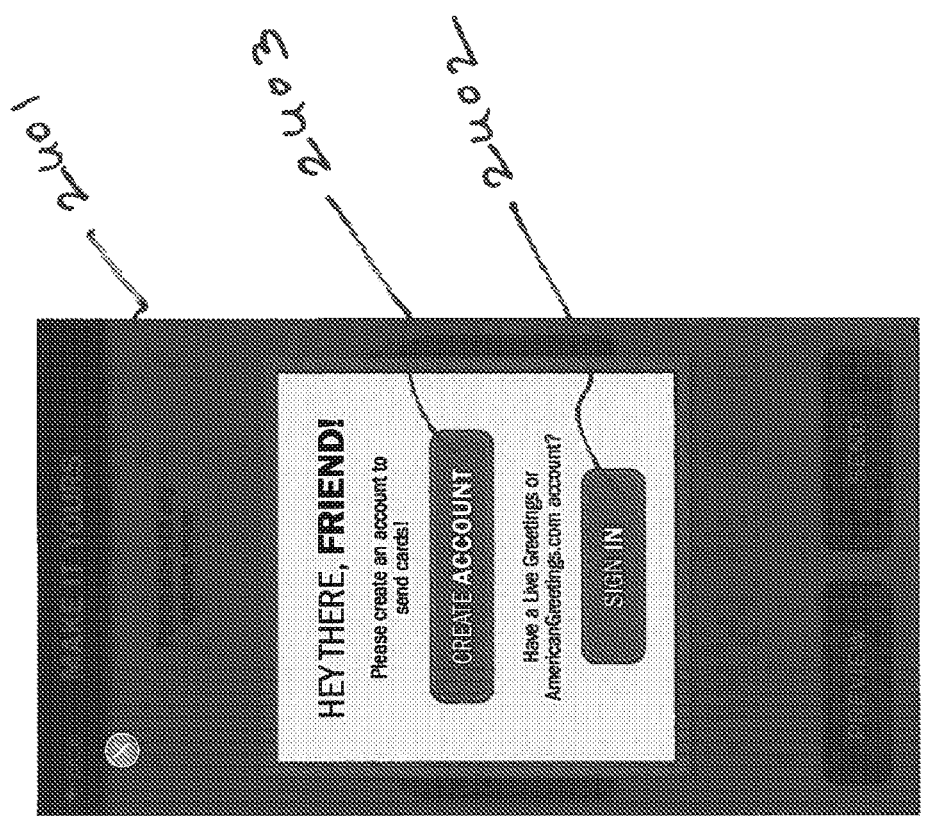
FIGS. 24-26 show exemplary screens for user sign-in and new user creation in the inventive system.

If user 150 chooses to send the card by activating the send selector 1104, user 150 is directed to an authentication screen 2401 as shown in FIG. 24, where user 150 is given the choice to either sign in to the system 100 (at 2402), or to create a new account in the system 100 (at 2403).

Figure 25:
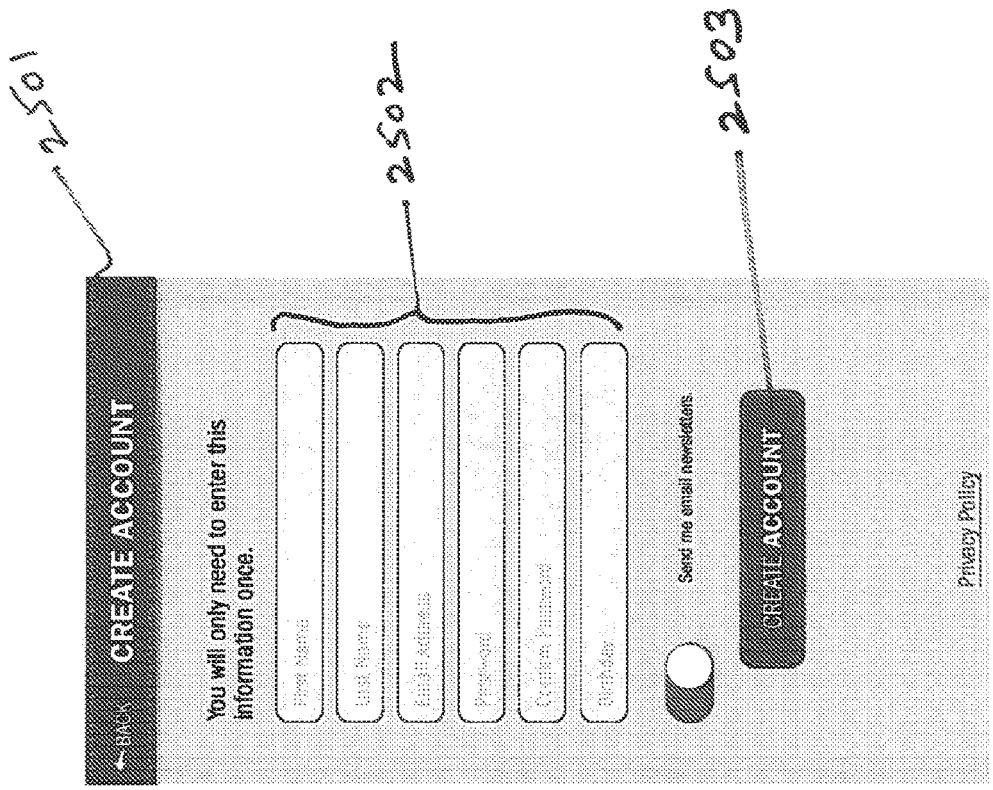

If user 150 chooses to create a new account on screen 2401, user 150 is directed to a new account creation screen 2501 as shown in FIG. 25. User 150 may enter one or more sign-up details 2502 (e.g. first name, last name, email address, password, date of birth) to create a new account with the system 100. User 150 may then activate the create account link 2503 to create a new account.

Figure 26:
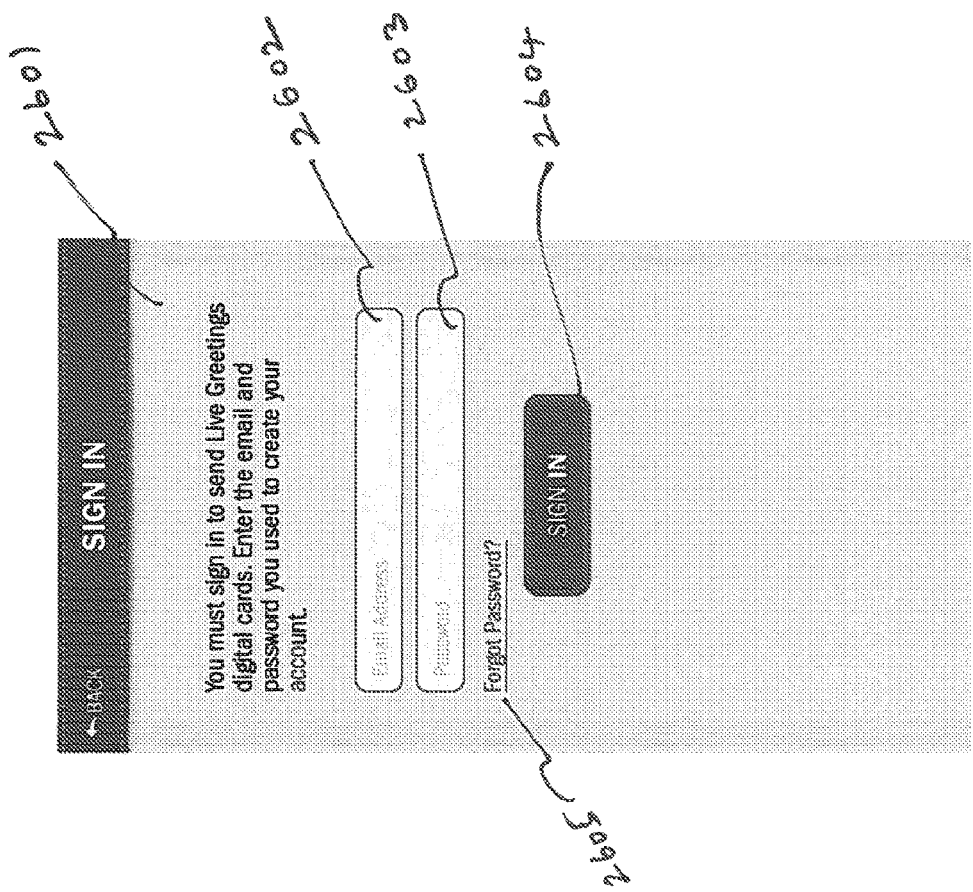

If user 150 chooses to sign in on screen 2401, user 150 is directed to a sign in screen 2601 as shown in FIG. 26. User 150 may enter their username 2602, password 2603 and sign in using link 2604. User 150 has an option to request a new password by activating the forgot password link 2605.

Figure 16:
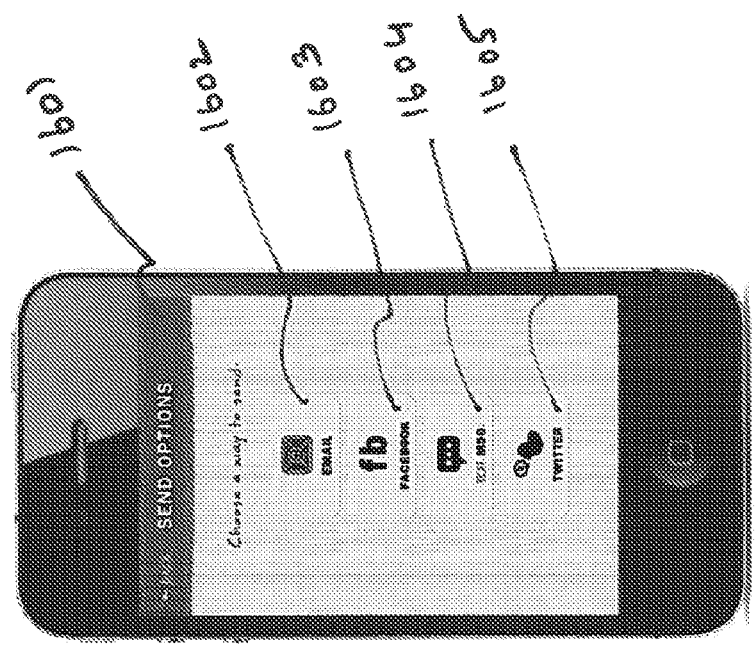

Once user 150 either creates a new account or signs in, user 150 is directed to screen 1601 of FIG. 16. On screen 1601, user 150 is presented with four send options: send card 160 via email (1602), send card 160 via Facebook® (1603), send card 160 via a text message or a short message service message or an iMessage® (1604), and send card 160 via Twitter® (1605). Although not shown FIG. 16, user 150 and the recipient may have the option to share and "like" the card 160 on various social networking sites such as Google+®, Facebook®, or Twitter®.

If user 150 chooses to send the card 160 via email 1602, user 150 is directed to an email page (not shown). The email page has an option for user 150 to enter one or more email addresses and send the card 160 by activating a send link.

If user 150 chooses to send the card 160 via Facebook® 1603, user 150 is directed to a Facebook® page (not shown). If user 150 is not already signed in to the Facebook® service on the portable computing device 120, user 150 is directed to a login screen where user 150 is able to enter their user credentials (e.g. a username and a password) and login to the Facebook® service. Next, user 150 is able to choose between posting the card 160 on their own wall or on a friend's wall. If user 150 chooses to post the card 160 on their own wall, user 150 is directed to their Facebook® wall page, where user 150 is able to post the card 160 along with a personalized message. If user 150 chooses to post the card 160 on a friend's wall, user 150 is directed to a friend selector page on Facebook®, where user 150 is able to choose from one or more friends by either selecting them from the Facebook® friend list or by searching for them within the Facebook® interface. Once user 150 chooses a friend on whose wall to post the card 160, user 150 is directed to the selected friend's Facebook® wall page, where user 150 is able to post the card 160 along with a personalized message.

If user 150 chooses to send the card 160 using the text message link 1604, user 150 is directed to a text message page (not shown). User 150 is able to fill out the recipient contact information (e.g. mobile number) and send the card 160, with an optional introductory message. The contact information for the recipient may also be extracted from the portable computing device 120. The text message may also be sent using the native text message options built into the portable computing device 120 (e.g. iMessage®).

If user 150 chooses to send the card 160 via Twitter® 1605, user 150 is directed to a Twitter® page (not shown). If user 150 is not already signed in to the Twitter® service on the portable computing device 120, user 150 is directed to a login screen where user 150 is able to enter their user credentials (e.g. a username and a password) and login to the Twitter® service. Next, user 150 is able to choose between posting the card 160 on their own wall or on a friend's wall. If user 150 chooses to post the card 160 on their own wall, user 150 is directed to their Twitter® wall page, where user 150 is able to post the card 160 along with a personalized message. If user 150 chooses to post the card 160 on a friend's wall, user 150 is directed to a friend selector page on Twitter®, where user 150 is able to choose from one or more friends by either selecting them from the Twitter® friend list or by searching for them within the Twitter® interface. Once user 150 chooses a friend on whose wall to post the card 160, user 150 is directed to the selected friend's Twitter® wall page, where user 150 is able to post the card 160 along with a personalized message.

Figure 27:
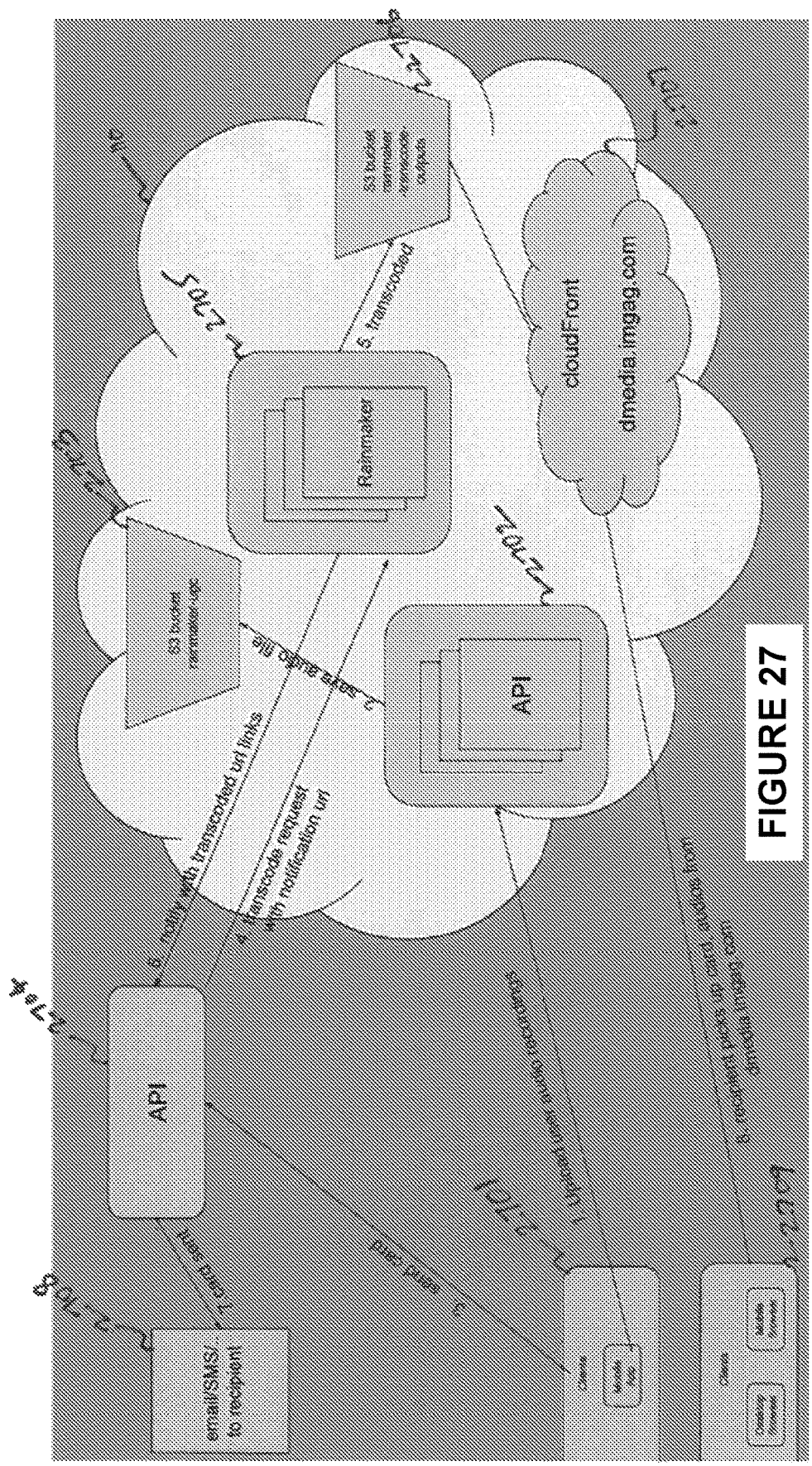
FIG. 27 is an exemplary flowchart of the inventive system.

If user 150 chooses to send the card 160 via any of the four send options 1602, 1603, 1604 or 1605, a transcoding process is initiated as shown in FIG. 27. At 2701, the user's audio recording (e.g. personalized message), if any, is uploaded to network 110. At 110, the audio recording is processed via an application programming interface 2702 and saved on a server 2703. Server 2703 may be a web or a network server that is in communication with network 110. Exemplary web or network servers are Amazon S3 servers provided by Amazon®. Contemporaneous to the user's audio recording being uploaded to network 110, the remaining portions of the card 160, e.g. signature, are uploaded to the network 110 through a second application programming interface 2704. In the network 110, a request to transcode the card 160 along with a notification url is sent to a processor 2705, which transcodes the audio portions of the card 160. Another server 2706 stores the transcoded audio and saves it on the network 110. The transcoding process may utilize transcoding technology such as Zencoder® provided by Brightcove®. Server 2706 may be a web or a network server that is in communication with network 110. Exemplary web or network servers are Amazon S3 servers provided by Amazon®. In one embodiment, a cloud server 2707 saves the transcoded audio on the network 110. Processor 2705 processes the transcoded audio files and notifies the application programming interface 2704 of one or more transcoded url links for the transcoded audio files. At 2708, the card 160 is sent to the recipient chosen by user 150. When the recipient picks up or chooses to play the card at 2709, the previously stored transcoded audio is rendered via network 110 and/or cloud server 2707 onto the card 160. Prior to playback on the card 160, the transcoded audio is de-coded to fit the specific computing environment of the recipient. For example, the decoded audio file rendered to the recipient will be different in a desktop platform as compared with a mobile platform. Transcoding and decoding of messages allows the ecard 160, and specifically the audio recordings, to be played across a wide variety of mobile platforms such as iOS® and Android®.

Figure 17:
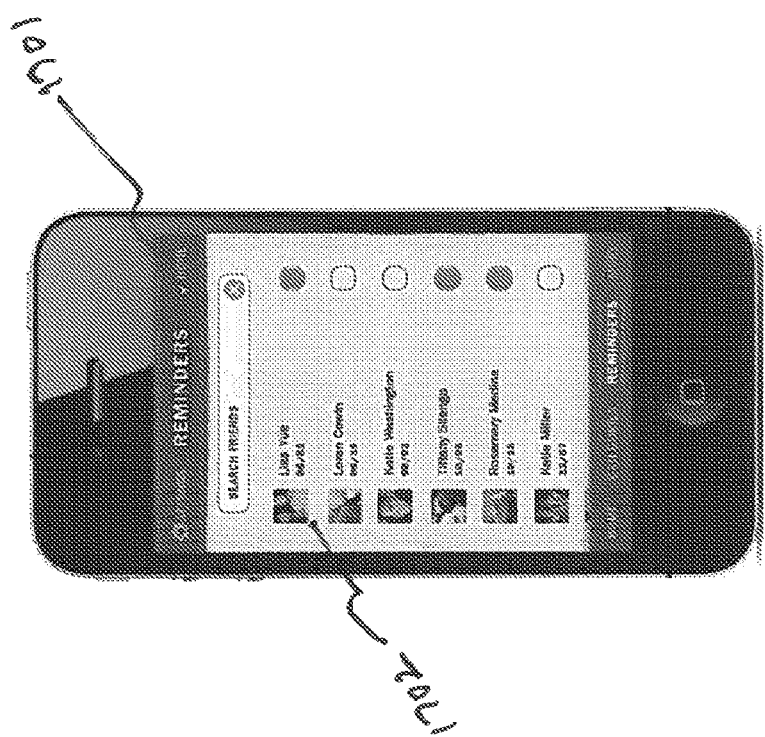

In an embodiment, if signed in to the system 100 via ecard app 130, user 150 is presented with a reminder screen 1701 as shown in FIG. 17. Reminder screen 1701 may serve as a reminder hub for user 150, where user 150 is able to review a list of events 1702. The list of events 1702 may be events that have previously been entered by the user 150, or events that were imported from user's device 120, or events that were imported into the app 130 by way of the user 150 connecting and downloading a list of events stored on the user's social networking account(s) (e.g. Facebook®, Twitter®). User 150 may select an event 1702, to prepare and send an ecard 160 to the selected contact associated with the event 1702.

Figure 18:
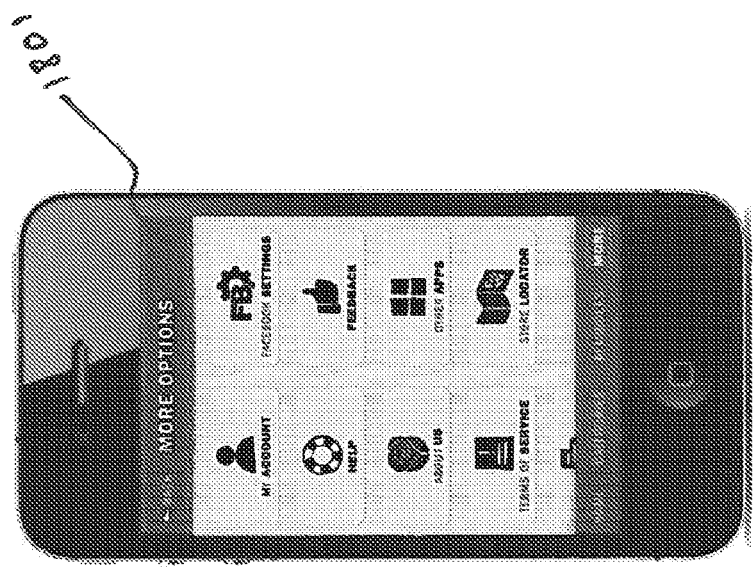

FIG. 18 shows an exemplary options screen 1801 that presents user 150 with a list of available options in the ecard app 130.

Figure 19:
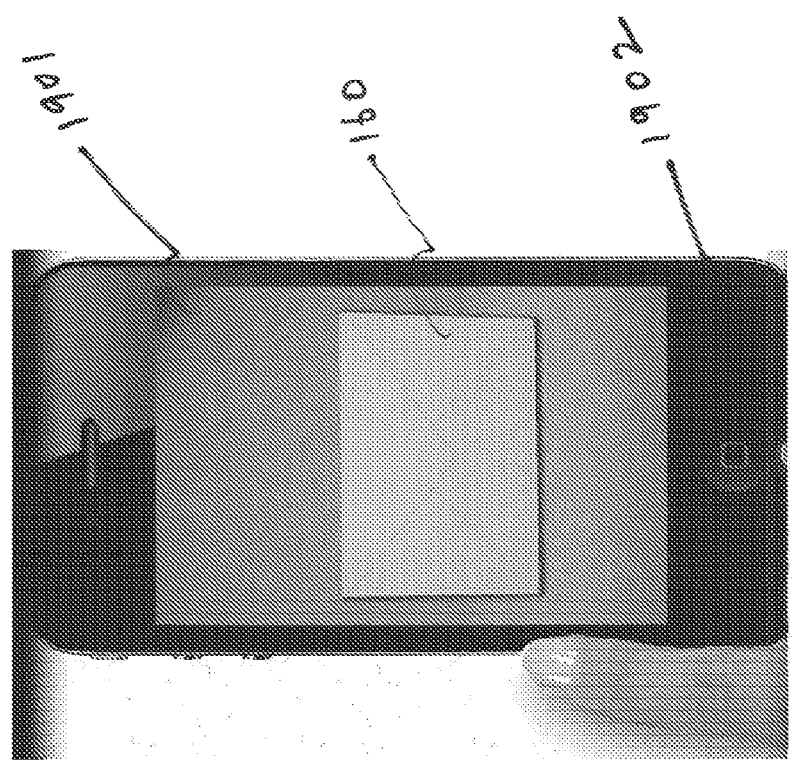

FIGS. 19-23 show an exemplary embodiment of the pickup experience of ecard 160 as viewed by the recipient of ecard 160. For the purposes of this description, it is assumed that the recipient also has the ecard app 130 installed on their device, and chooses to pick up the ecard 160 using the app 130. Screen 1901 of FIG. 19 shows the recipient receiving the ecard 160 on a device 1902. Device 1902 may be a device that houses the ecard app 130 (similar to device 120), or may be a standalone device.

Figure 20:
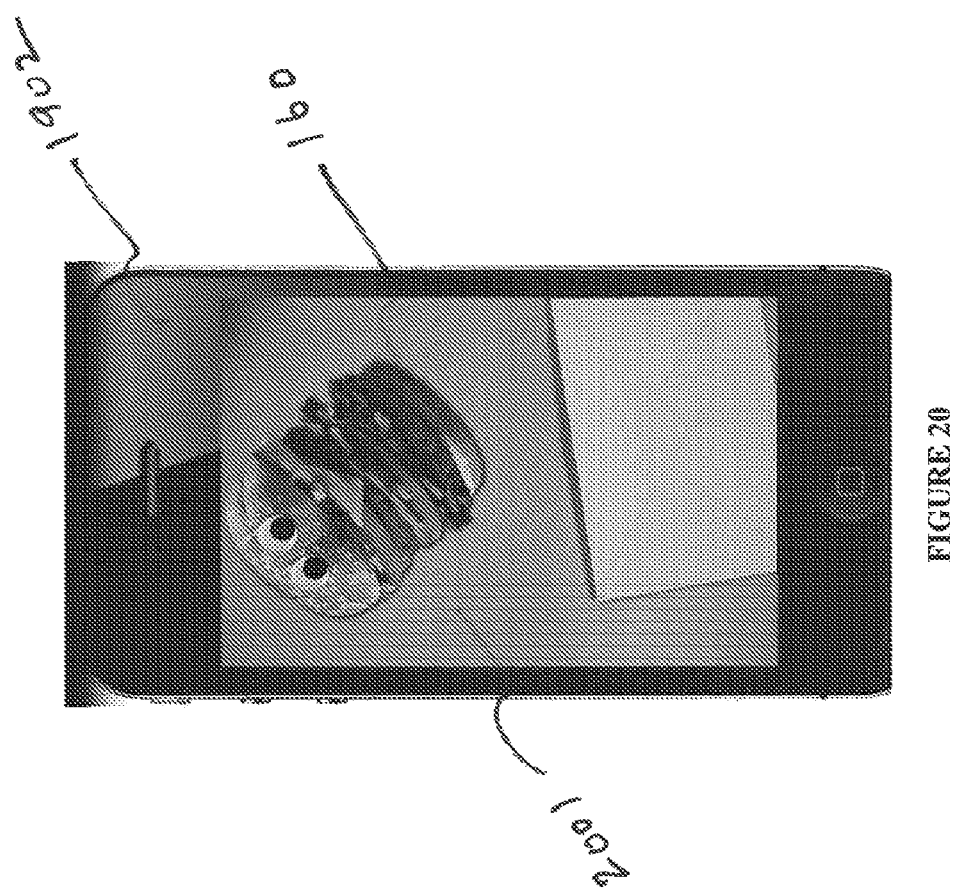
Figure 21:
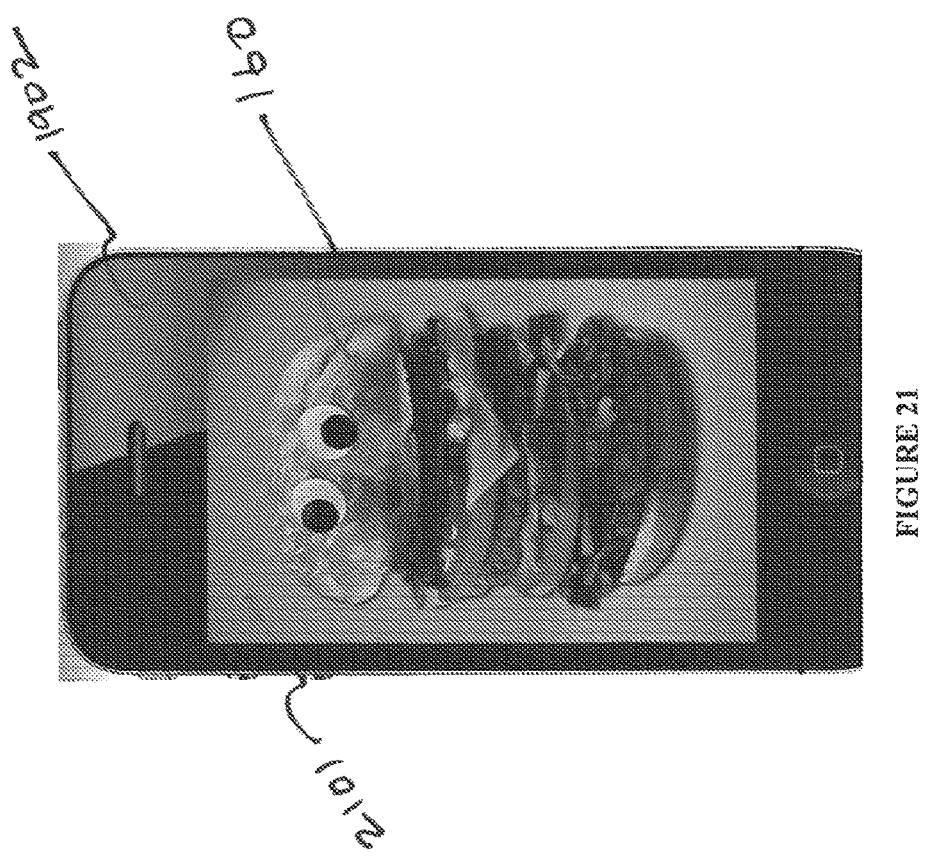
Figure 22:
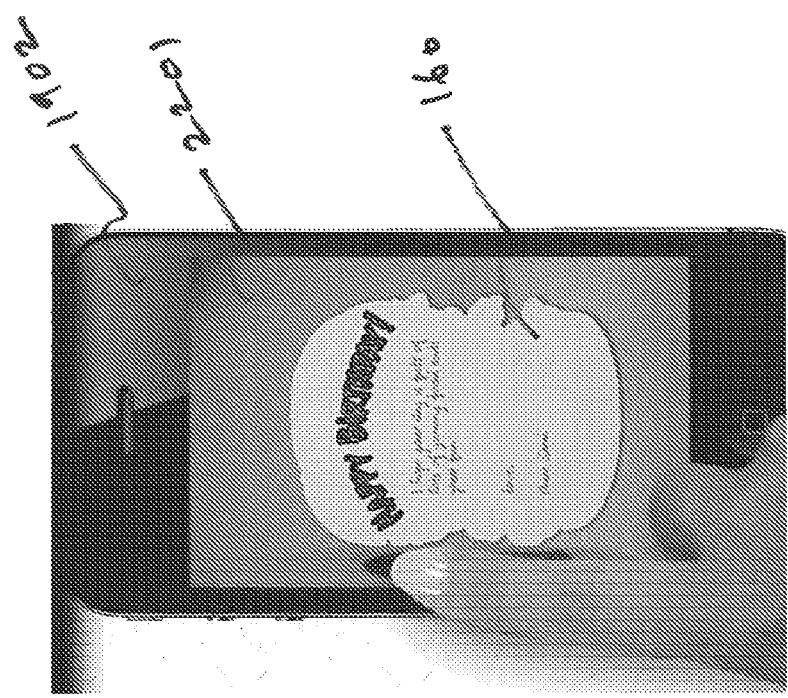
Figure 23:
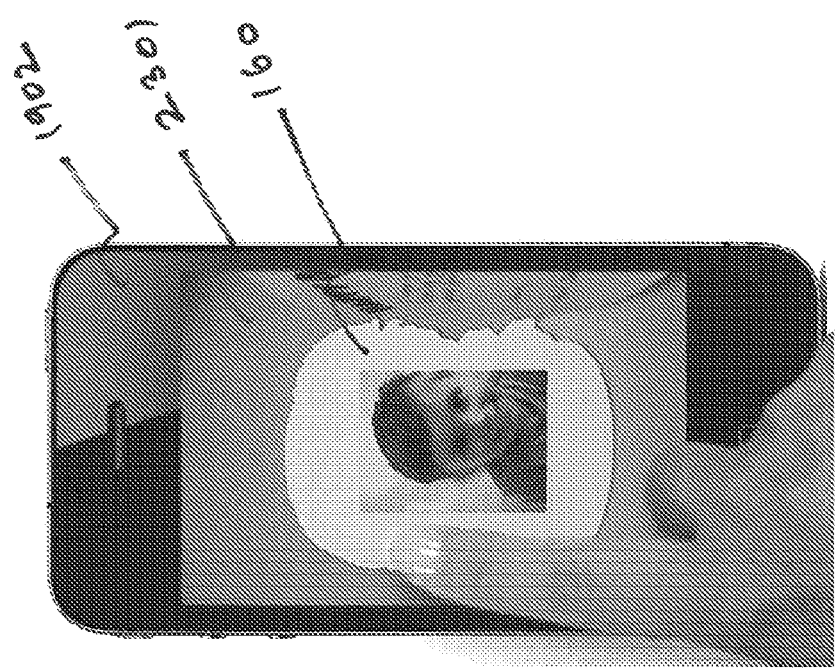

As shown in FIG. 20, Ecard 160 is a hamburger head that moves up and down, wiggles, animates, talks, and sings. Any of the parts that comprise the hamburger, such as the vegetables and cheese, may move as well. The animation may be a partial or full animation, with a partial animation configured to show the animation along with other customizable components of the ecard 160, whereas a full animation is implemented to show the animation by itself without any other component interactions. Ecard 160 may be rendered as described in the '045 application referenced earlier. Further, the animations of the ecard 160 may be designed to imitate the mechanical movements of the mobile objects and moveable objects described in U.S. Pat. No. 8,695,242, entitled "MOTION GREETING CARDS," which is hereby incorporated by reference in full.

When the recipient opens an exemplary rendering of a digital outer envelope, ecard 160 is shown, as can be seen on screen 2001. An exemplary view of a fully loaded ecard 160 is shown in screen 2101 of FIG. 21. The recipient may choose to open the ecard 160 to find the customized message and signature as shown in screen 2201 of FIG. 22, and the personalized photo as shown in screen 2301 of FIG. 23. The personalized recorded message as shown with reference to FIG. 15 may be played in the background when the recipient opens the ecard 160, and may continue to play during the entire card viewing experience. Alternately, the recipient may be presented with a message player (not shown), selecting which plays the personalized recorded message back to the recipient.

The recipient interactions in receiving and viewing the card 160 through the ecard app 130 may also be replicated on a web browser, especially in situations where the recipient is unable or unwilling to download the ecard app 130. If the ecard 160 is being picked up on a web browser, the web browser may be optimized to render the content and graphics of the card 160. As an example, the web browser may be optimized using HTML, JavaScript, and GreenSock (an animation library for website pickup, including using HTML5) in order to properly render the content and graphics of the card 160. Utilizing HTML or HTML 5 in conjunction with JavaScript and GreenSock, ecard 160 is rendered to the user 150 as a 3-dimensional card. The web page that renders the ecard 160 may also be configured to check for the technical specifications of the web browser in which the card 160 is being rendered. If the web browser being used to render card 160 does not contain the technical features (e.g. a certain pre-determined version of the browser, JavaScript etc) required for a full rendering of card 160, the web page may present the user 150 with a "pared-down" version of card 160 without some features, such as the 3-dimensional rendering.

Ecard 160 may also be picked up using a mobile optimized browser builder. Exemplary operations and flow of receiving and viewing an exemplary ecard via a mobile optimized web browser are fully described in International Patent Application No. PCT/US14/24074, entitled "VIRTUAL SHOP FOR ELECTRONIC GREETING CARDS" ("the '074 application") which is incorporated herein by reference in full.

As described in further detail in the '074 application, the mobile optimized browser builder is rendered to user 150 on the portable computing device 120 via JavaScript, an interpreted computer programming language. The mobile optimized browser builder is essentially a single web page JavaScript application. All of the page interactions happen through JavaScript, in addition to Cascading Style Sheets and Canvas technology. The rendering of the card happens through Scalable Vector Graphics (SVG) and Extended Markup Language via Application Program Interfaces. Further, advanced image processing and rendering on the card 160 are accomplished using JavaScript and Canvas technologies.

One method of rendering an animation in an ecard that has been picked up by a recipient of the ecard builds on the description of using SVG files provided in U.S. patent application Ser. No. 13/460,045, which has been incorporated herein by reference in full, particularly at Paragraphs 51 through 61. For example, to create animation effects on page 1 of an ecard that is a hamburger shown in FIG. 21 for example, information is added to the SVG XML library file by the creator of the ecard. This information is as follows:

1. The names of the image assets to be animated on page 1 in coordination with decoded music in the audio file. Examples of assets to be animated in this example would include the "whites" of the hamburgers eyes, the pupils of the hamburgers eyes and any other portion of the hamburger to be animated or moving in coordination with the audio file.
2. The X, Y and Z coordinates of each animation effect identified in 1. The X and Y coordinates are horizontal and vertical coordinates respectively. The Z coordinate is the order of objects as they appear looking into the ecard. Z-order is an ordering of overlapping two-dimensional objects in a 3D application. One of the features of a typical Graphical User Interface such as a computer monitor or portable computing device is that windows may overlap, so that one window hides part or all of another. When two windows depicting objects overlap, their Z-order determines which one appears on top of the other. The coordinates must be specified for the initial start or origin of each animation effect as well as the coordinates of the placement of the animation throughout the activation of the animation effect.
3. The duration of the time for each animated asset to be animated that is described in 1.
4. Setting the start and stop times for animation to begin and end. This is called, setting key frame times. Setting key frame times is done to coordinate certain animations to coincide with certain sound effects or beats in songs contained in the audio file.
5. The type of animation movement for each animation effects such as straight line, repetitive or circular movement.

These parameters are defined or programmed in each SVG file for each ecard. This information is parsed from the SVG file into JSON format that is then used by the JavaScript of the page. JSON or JavaScript Object Notation, is an open standard format that uses human-readable text to transmit data objects consisting of attribute-value pairs. It is used primarily to transmit data between a server and web application, as an alternative to XML. The animated assets within the card are transcoded into JavaScript and used by the animation library (GreenSock) to coordinate the visual effects with the audio file when the card is picked up by the recipient in 2709 on FIG. 27, so that the animation appears synced or coordinated with sound effects or music in the card. The recipient then views or experiences the synced audio and visual effects of the animation. The animation effects can be placed on any page of the ecard and can be any type of visual effect or animation. The hamburger is just one example.

The above description of specific embodiments has been given by way of example. From the disclosure given, those skilled in the art will not only understand the general inventive concepts and attendant advantages, but will also find apparent various changes and modifications to the structures and methods disclosed. For example, although the embodiments disclosed herein have been primarily directed to a portable computing device, the general inventive concepts could be readily extended to a non-portable computer (PC) or other relatively fixed console computers, and may be pursued with reference to a website and/or other online or offline mechanisms. Further, other social networking sites other than those specifically described herein may be used as delivery media for electronic greeting cards. As another example, the general inventive concepts are not typically limited to any particular interface between a user and the user's mobile computing device. Thus, for example, use of alternative user input mechanisms, such as voice commands and keyboard entries, are within the spirit and scope of the general inventive concepts. As a further example, the general inventive concepts are not typically limited to just mobile applications. Other browsing environments which permit the rendering and usage of the mobile application's features may be employed. For example, social networking applications such as Facebook® and Twitter® may be utilized to render and use the mobile application's pages (e.g. within the Facebook® browser), or mobile optimized web browsers may be used. It is sought, therefore, to cover all such changes and modifications as fall within the spirit and scope of the general inventive concepts, as described and claimed herein, and equivalents thereof.

The invention claimed is:

1. A system for providing an electronic greeting card having audio and other portions, the system comprising:
    a network having
        a first application programming interface ("API"),
        a second API,
        a processor, and
        a first server;
        a second server;
        a recipient electronic device;
        wherein the audio portion is transmitted to the first API, the other portions are transmitted to the second API with a notification address,
        wherein the audio portion is stored on the first server,
        wherein the audio portion is transcoded by the processor,
        wherein the processor notifies the second API of at least one link to the transcoded audio portion;
        wherein the transcoded audio portion is stored on the second server,
        wherein the electronic greeting card is sent to the recipient electronic device, and, when the recipient device accesses the transmitted electronic greeting card, the transcoded audio portion is rendered to the recipient electronic device and decoded based on the operating environment of the recipient device.

2. The system of claim 1, wherein the second server is within the network.

3. The system of claim 1, wherein the second server is external to and connected to the network.

4. The system of claim 1, wherein the second server is a cloud server connected to the network.

5. The system of claim 1, wherein the electronic greeting card is created by user of a mobile application of a mobile device.

6. The system of claim 5, wherein the mobile application includes an interface for adding a digital photograph to the electronic greeting card.

7. The system of claim 5, wherein the mobile application includes an interface for adding a personalized message to the electronic greeting card.

8. The system of claim 5, wherein the mobile application includes an interface for adding a digital signature to the electronic greeting card.

9. The system of claim 5, wherein the mobile application includes an interface for adding the audio portion to the electronic greeting card.

10. The system of claim 5, wherein the mobile application includes an interface for selecting a transmission medium for transmitting the electronic greeting card.

11. The system of claim 10 wherein the transmission medium is selected from the group consisting of an email, a text message and a social networking site.

12. A method for providing an electronic greeting card having audio and other portions, the method comprising:
    transmitting the audio portion of the electronic greeting card to a network through a first application programming interface ("API") of the network;
    storing the audio portion on a first server;
    transmitting the other portions of the electronic greeting card to the network through a second API of the network;
    transmitting a request to a processor of the network to transcode the audio portion, wherein the request includes a notification address;
    transcoding the audio portion;
    storing the transcoded audio portion on a second server;
    notifying the second API of a location of the stored transcoded audio portion;
    transmitting the electronic greeting card to a recipient device based on the notification address;
    rendering the transcoded audio portion from the second server and decoding the transcoded audio portion, based on the operating environment of the recipient device, when the recipient device accesses the transmitted electronic greeting card.

13. The method of claim 12, further comprising initiating creation of the electronic greeting card on a mobile application of a mobile device.

14. The method of claim 13, further comprising adding a personalized message to the electronic greeting card.

15. The method of claim 13, further comprising adding a digital signature to the electronic greeting card.

16. The method of claim 13, further comprising adding the audio portion to the electronic greeting card.

17. The method of claim 13, further comprising selecting a transmission medium for transmitting the electronic greeting card.

18. The method of claim 13, further comprising adding a digital photograph to the electronic greeting card.

* * * * *